UNITED STATES PATENT OFFICE.

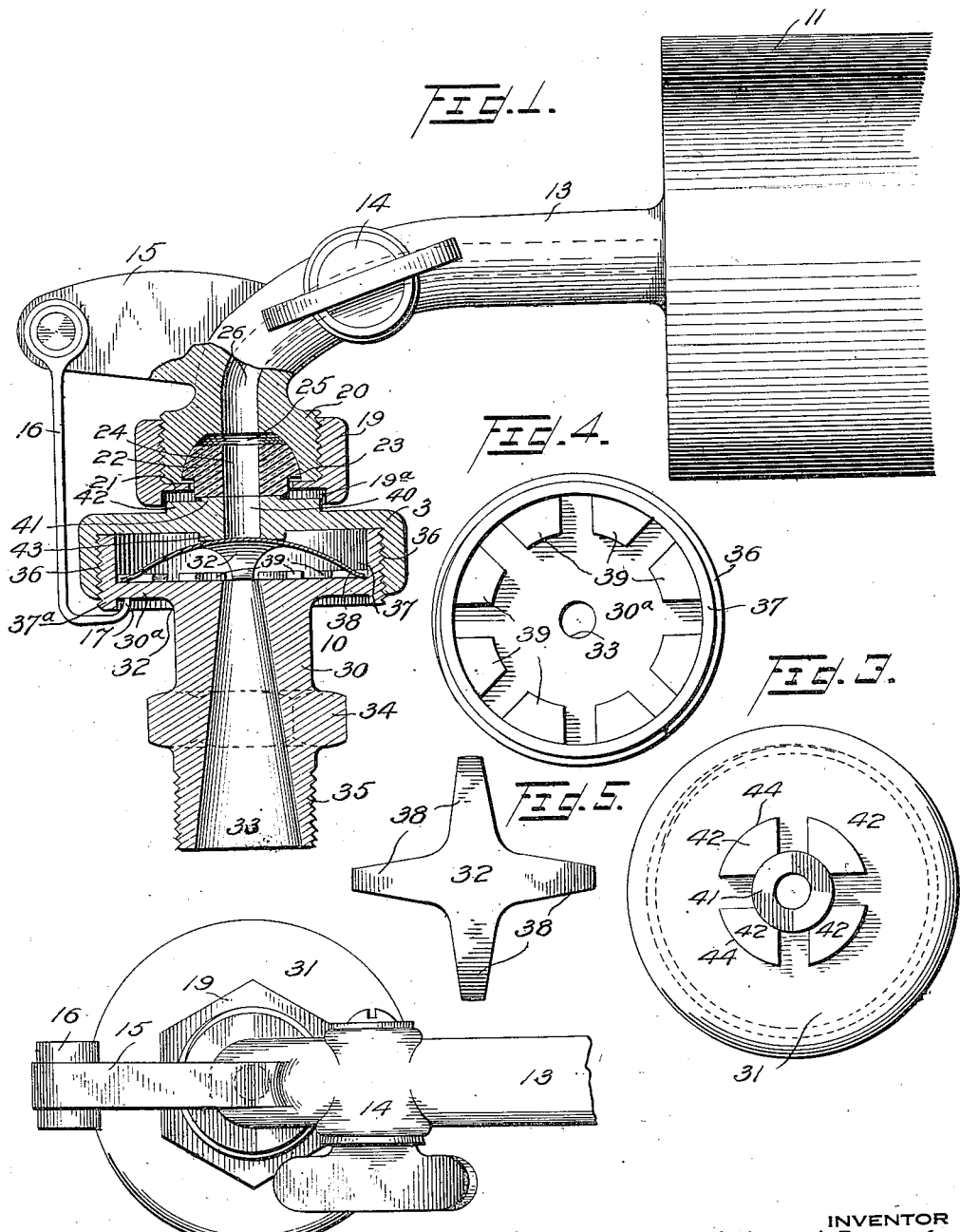

WILLIAM HENRY DUPRÉ, OF VICKSBURG, MISSISSIPPI.

GREASE-CUP.

1,393,097.  Specification of Letters Patent.  Patented Oct. 11, 1921.

Application filed March 30, 1920. Serial No. 369,940.

*To all whom it may concern:*

Be it known that I, WILLIAM H. DUPRÉ, a citizen of the United States, residing at Vicksburg, in the county of Warren and State of Mississippi, have invented a new and useful Grease-Cup, of which the following is a specification.

This invention relates to grease cups.

The general object of the present invention is to provide a grease cup which will meet the lubrication requirements of such equipment as aeroplanes, automobiles, motor boats, agricultural and textile machinery, etc., such equipment requiring a relatively easy flowing lubricant. The ordinary form of grease cup consists of a stem and a barrel screwed upon the stem, which barrel serves as the grease reservoir and stores the lubricant in a position where the bearings will not get the benefit of the same.

One object of my invention is to provide a grease cup which will carry the lubricant contained therein directly to the bearings. This result is reached in part by locating a conical grease-holding chamber in the stem of the grease cup instead of in the head portion thereof. Such a grease cup will not hold the lubricant in a dormant state but will feed it as fast as the bearings will take it up.

A further object is to provide a grease cup which will eliminate the necessity of removing any of the parts when re-filling. This latter object is attained by providing an automatic valve in the head of the grease cup, which valve yields when grease is forced under compression into the head and closes again to keep foreign matter out of the grease cup when the pressure has been relieved.

An additional object is to provide means combined with a grease cup by which a force filler may be anchored thereto when the grease cup is being filled so that no lubricant is lost as it passes from the force filler into the cup.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing,

Figure 1 is a longitudinal sectional view of a grease cup constructed in accordance with this invention, showing the nozzle of a special type of force filler applied thereto.

Fig. 2 is a plan view of the parts shown in Fig. 1.

Fig. 3 is a plan of the cap or head of the grease cup.

Fig. 4 is a plan view of the interior of the head or valve chamber of the grease cup.

Fig. 5 is a plan view of the resilient valve.

The device of the present invention is especially designed to be used in connection with a force filler or grease gun of the type disclosed in my application filed of even date herewith, Serial No. 369,939, and reference should be made to said application for an understanding of the construction, uses and advantages of the force filler.

Fig. 1 shows a grease cup 10, to which a grease gun or force filler is applied for the purpose of filling the same. Such grease gun includes the body 11, the spout or neck 13, the cut-off valve 14 and arm 15 integral with the neck 13, and a hook 16 pivotally mounted on the outer end of the arm, which hook has an inturned end 17.

The nozzle of the neck or spout 13 includes an enlarged screw threaded portion 20 receiving a nut 19, which nut is provided with an annular web 21 extending inwardly. The neck has a passageway 26 which is closed by the valve 14 at will, and the enlarged portion or head 20 has an opening 25 approximating in form a segment of a sphere. This opening 25 provides means by which a washer 22 of some flexible material, as rubber or the like, is retained. The washer 22 has a passageway 24 in line with the passageway 26. The web 21 holds the washer from moving outwardly with respect to the nozzle while permitting inward movement of the washer. The nut 19 has a rim 19ª adapted to fit upon parts of the grease cup to be described. The washer 22 is also adapted to press upon the head of the grease cup when lubricant is to be introduced into the same. The hook end 17 is designed to engage under the head of the grease cup so that the force filler may rock upon this point of engagement as a fulcrum to effect a tight joint between the grease cup and the force filler.

The foregoing construction will be found to be described in more detail and claimed in the co-pending application referred to above.

The grease cup proper comprises three parts, namely, a headed stem 30, a hood or cap 31 and a valve 32. The stem 30 is shown in the drawings as being straight but may be bent at any angle desired to accommodate the grease cup to the bearing which it is desired to lubricate. The stem 30 may have a nut 34 formed integrally therewith, or such nut may be eliminated. A substantially conical grease chamber 33 is provided in the stem 30, when the latter is straight. In case the stem is bent, such grease chamber may be described as increasing uniformly in width (diameter) toward the attaching end 35 of the stem; thus the grease chamber 33 may be said to taper as the head 30ª is approached.

The head 30ª is formed integrally with the stem and has a cylindrical wall 37 screw threaded on its periphery, as indicated at 36. This wall forms a cylindrical valve chamber in the head of the grease cup wherein the valve 32 is housed. The wall 37 is provided with a rim 37ª especially designed to be engaged by the hook end 17 when the force filler is in position. The small end of the grease-holding chamber 33 is in communication with the cylindrical valve chamber centrally thereof.

The valve 32 comprises a piece of spring metal or the like having a plurality of legs 38, which legs hold the valve spaced above the head 30ª in such position that the cap 31 bears against the valve. The spread of the legs 38 is such that the valve may move inwardly to admit grease into the cylindrical chamber without undue resistance. The head 30ª carries a series of raised lugs or projections 39, such projections being formed integrally with the head and rising from what constitutes the bottom wall of the cylindrical valve chamber. Such projections are spaced from each other as shown in Fig. 4, the spaces being at least as wide as the width of the legs 38 of the valve. The legs of the valve are adapted to be received between certain of these projections or lugs in the manner shown in Fig. 1; thus the valve cannot turn in the cylindrical chamber. These raised lugs or projections have a second function, namely, to receive the head of a properly shaped wrench so that the screw threaded end 35 of the stem 30 may be screwed into place upon the machine which is to be lubricated. It will be clear that the nut 34 may be used for the same purpose.

The cap or hood 31 is cup-shaped like the head 30ª and fits over the same, the screw threads 36 providing a convenient means for holding the head and cap together. This cap has an aperture or port 40 located in alinement with or directly above the grease chamber 33 and having a diameter or width approximateing that of the grease chamber at its entrance end. Formed integrally with the cap on each face thereof and in surrounding relation to the port 40 are bosses 41 and 43, the latter boss acting as a seat for the valve 32. In surrounding relation to the boss 41, but having a less height above the cap than the same is a series of spaced and raised lugs 42 (see Fig. 3). These lugs approximate in plan a quadrant having arcuate outer edges 44 designed to fit within the rim 19ª of the nozzle of the force filler described. These raised lugs are also designed to receive the head of a properly shaped wrench so that the cap may be screwed home upon the head of the grease cup. The boss 41 provides a seat for the washer 42, which washer has a greater diameter than said boss. The port 40 approximates in size the passageways 24 and 26 of the force filler.

It will be clear that any grease forced down through the port 40 will press the valve 32 inwardly, and then spreading out through the valve chamber will readily find its way down into the grease chamber 33, the legs 38 occupying such a small space that the free passage of the grease will not be interfered with. The shape of the grease chamber 33 is such that it will dispense the grease contained therein instead of merely storing it up. In the ordinary grease cup, one must give the cup a few turns every time grease is to be dispensed. Frequently this is neglected with the result that the working parts do not receive a sufficient amount of grease. With the present invention, all the grease in the grease cup will ultimately find its way down into the working parts. A special advantage of the use of the valve is that all dust and foreign matter is kept out of the grease and yet a fresh supply of lubricant may readily be introduced into the cup without touching any of the parts. A grease cup such as the one described is especially useful when applied to machinery subjected to a high angular velocity because grease cannot be spattered if the cup is filled when the machine is working.

What is claimed is:—

1. In a grease cup, a body having a grease-holding chamber therein, said chamber having its least width at the grease entrance end and having its greatest width at the grease discharging end, the chamber increasing uniformly in width intermediate said ends whereby grease contained in the cup has no tendency to stay in the same but is carried directly to the part lubricated.

2. In a grease cup, a body having a valve chamber and a substantially conical grease chamber in communication, the small end of the conical chamber opening into the bottom of the valve chamber and the top of the valve chamber having an aperture, and valve means normally closing said aperture and spaced from the small end of the conical chamber.

3. In a grease cup, a body including a stem providing a grease chamber and a hollow head providing a valve chamber, said chambers communicating, the grease chamber being smallest where in communication with the valve chamber and increasing uniformly to its largest dimension at the outer end of the stem, a valve, and means coöperating with the valve for closing the hollow head.

4. In a grease cup, a body including a stem and a cap-shaped head, said head being at one end of and wider than the stem, annular flanges extending on each side of the bottom of the head, a cap or hood removably engaged with the flanges to substantially close the head and form a valve chamber therewith, and valve means within the chamber.

5. In a grease cup, a body having a valve chamber and a passageway for grease leading off therefrom, a valve in the chamber formed of spring metal having a plurality of legs, and means engaging with the legs for holding the valve from turning.

6. In a grease cup, a body having a valve chamber and a passageway for grease leading off therefrom, said chamber being of considerably greater width than the passageway, a valve in the chamber having resilient legs, the length of the two opposite legs being equal to the width of the chamber, and means engaging with the legs for holding the valve from turning.

7. In a grease cup, a body including a head and a stem, the stem having a longitudinal passageway, the head being substantially cup-shaped, the passageway communicating with the bottom of the cupped portion, said bottom having a circular series of spaced projections extending upwardly, a valve held from turning by said projections, and means for closing the head, said means holding the valve in the cupped portion and bearing against the valve.

8. In a grease cup, a body including a head and a stem, the stem having a longitudinal passageway, the head being substantially cup-shaped, the passageway communicating with the bottom of the cupped portion, said bottom having a circular series of spaced projections extending upwardly therefrom, a valve having legs engaging with said projections to prevent turning thereof, and means for closing the head, said means having an aperture, said valve normally closing said aperture and bearing against said means.

9. In a grease cup, a body including a stem and a substantially cup-shaped head, a cap engaged with the head and forming therewith a valve chamber, said cap having an aperture, a passageway in the stem in communication with the head at a point directly opposite said aperture, a valve formed of spring metal located within the chamber normally closing the aperture, and means in the chamber and engaging with the valve to prevent turning thereof when the cap is screwed down upon the head.

10. In a grease cup, a grease holding body including a stem and a cup-shaped head, and a cap fitted to the head and forming a valve chamber, said cap having an aperture, a passageway in the stem in communication with the head at a point below the aperture, and a valve in the chamber normally closing the aperture and spaced from the entrance to the passageway of the stem, said valve being constructed of spring metal and having a plurality of legs.

11. In a grease cup, a grease-holding body, a valve chamber at one end of the body, the top of said chamber having an aperture, a boss projecting from the inner face of the top of the chamber in surrounding relation to the aperture, a valve held within the chamber and normally seated against the inner boss, and a plurality of spaced legs provided on the valve and shaped to engage the bottom wall of the chamber.

12. In a grease cup, a grease-holding body, a valve chamber at one end of the body, the top of said chamber having an aperture, a boss projecting from the upper face of the chamber in surrounding relation to the aperture, a valve held within the chamber, and a plurality of spaced lugs on the upper face of the chamber encircling the boss, said lugs having less height than the boss and having arcuate edges to engage with and seat the nozzle of a grease gun.

13. In a grease cup, a cylindrical valve chamber having its top provided with an aperture, a valve in the chamber normally closing said aperture, a grease chamber in communication with the valve chamber and in alinement with the aperture, said valve having a plurality of legs which are spread apart and engage with the bottom of the valve chamber for holding it away from the entrance to the grease chamber while permitting the same to move away from said aperture by the pressure of the grease.

14. In a grease cup, a body including a head and a stem, the stem having a longitudinal passageway, the head being substantially cup-shaped, a cap also substantially cup-shaped and forming with the head a valve chamber, said cap having an aperture, a valve in the chamber normally closing said aperture, the passageway communicating with the bottom of the valve chamber, said bottom having a circular series of spaced projections extending upwardly, said valve having a plurality of legs which are spread apart and engage between certain of the spaced projections at the bottom of the valve chamber for holding the valve away from the passageway while permitting the same to move away from the aperture, said projections also preventing the valve from turning, the valve normally being seated against the under side of the cap.

In testimony that I claim the foregoing as my own, I have hereto affixed my signature.

WILLIAM HENRY DUPRÉ.